United States Patent [19]

de Goncourt

[11] Patent Number: 4,667,921
[45] Date of Patent: May 26, 1987

[54] ELASTIC SUSPENSION DEVICE HAVING A GREAT ANGULAR RIGIDITY

[75] Inventor: Louis de Goncourt, Voisin-le-Bretonneux, France

[73] Assignee: Bertin & Cie, Plaisir, France

[21] Appl. No.: 724,547

[22] Filed: Apr. 18, 1985

[30] Foreign Application Priority Data

Apr. 19, 1984 [FR] France ................................ 84 06197

[51] Int. Cl.$^4$ ............................................ F16M 13/00
[52] U.S. Cl. ..................................... 248/618; 267/158
[58] Field of Search ............... 248/626, 627, 630, 618; 267/158, 164; 188/380

[56] References Cited

U.S. PATENT DOCUMENTS

| 90,082 | 5/1869 | DeKimp | 248/626 X |
| 382,207 | 5/1888 | Barrow | 248/626 X |
| 2,125,773 | 8/1938 | Drabenstott | 248/626 X |
| 3,185,428 | 5/1965 | Farabaugh, Jr. et al. | 248/626 X |

FOREIGN PATENT DOCUMENTS

| 0089858 | 9/1983 | European Pat. Off. . |
| 1940761 | 4/1966 | Fed. Rep. of Germany . |
| 2068009 | 8/1971 | France . |
| 2516455 | 5/1983 | France . |
| 595981 | 12/1947 | United Kingdom . |
| 1172886 | 12/1969 | United Kingdom . |

Primary Examiner—J. Franklin Foss
Assistant Examiner—David L. Talbott
Attorney, Agent, or Firm—A. W. Breiner

[57] ABSTRACT

The suspension device comprises at least one suspension element formed by an elastically yieldable leaf between two rigid end portions, and four bearing means symmetrically disposed in pairs relative to the transverse axis of symmetry of the leaf on each of the sides of the suspension element.

10 Claims, 7 Drawing Figures

U.S. Patent   May 26, 1987   Sheet 1 of 2   4,667,921
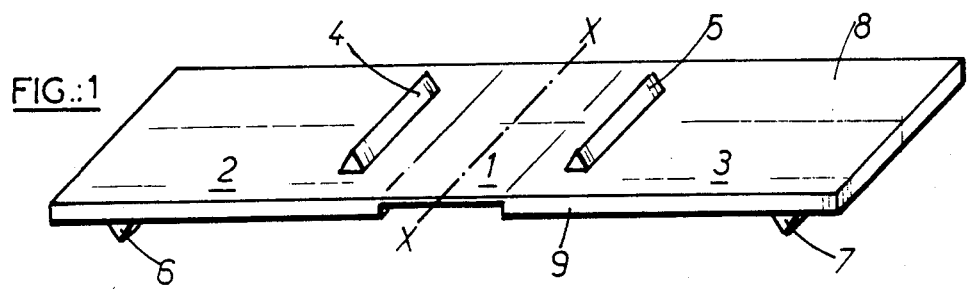
FIG.:1
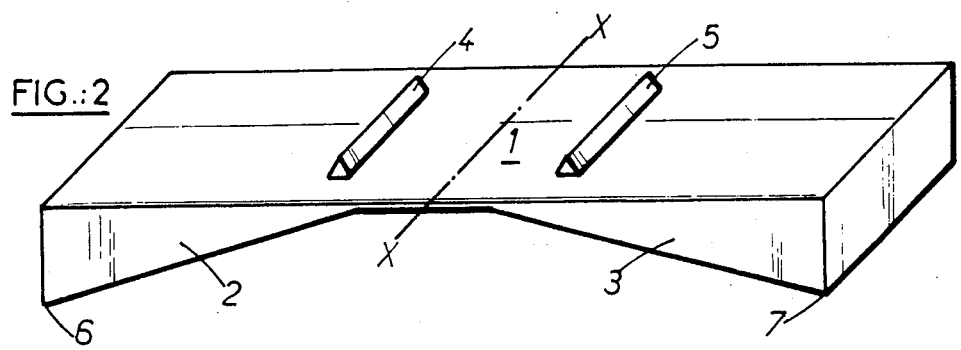
FIG.:2
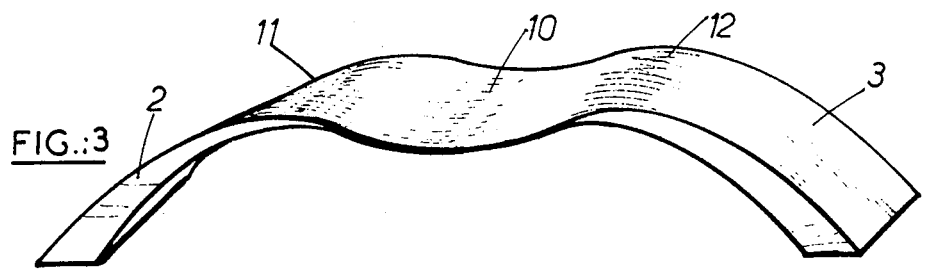
FIG.:3
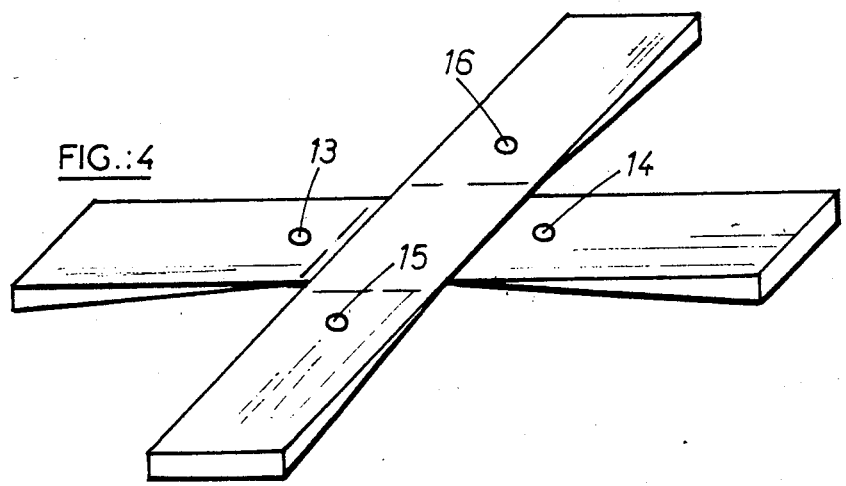
FIG.:4

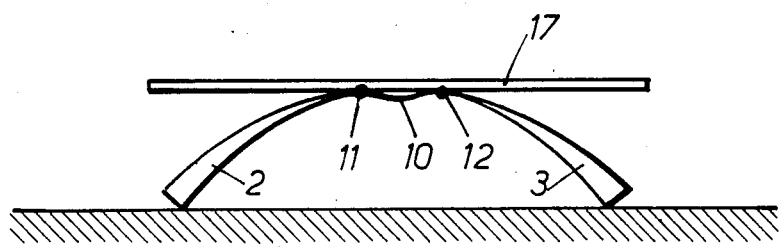
FIG.:5
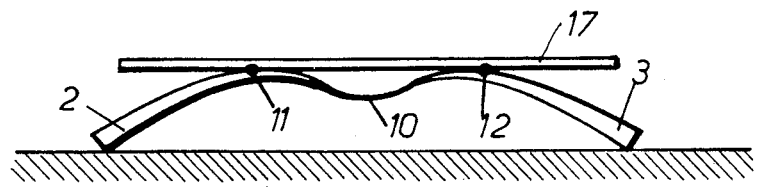
FIG.:6
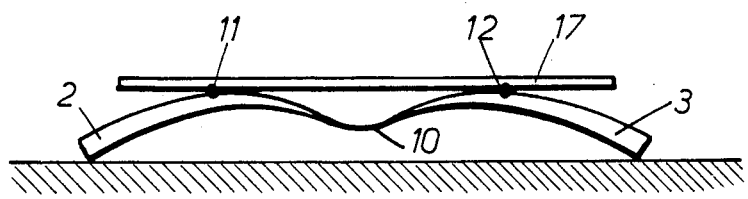
FIG.:7

ELASTIC SUSPENSION DEVICE HAVING A GREAT ANGULAR RIGIDITY

The invention relates to an elastic suspension device having a great angular rigidity disposed between a load and a support.

Devices for elastically suspending a load are known for interposing between the load and a support.

The term support is intended to mean the ground, a packing element or the platform of transporting means.

These devices are provided for preventing the transmission of vibrations or shocks from the load to the support and vice versa.

The devices usually employed comprise elastically yieldable means, such as springs and/or blocks of elastomer, secured in a variable number directly or indirectly to the support. The distribution of the elastically yieldable means is determined by the distribution of the masses of the load. This sensitivity to the positioning of the load is remarkable for example in the case of a carrier or frame insulated from a support surface (ground or other surface) by an anti-vibration device on which a load is disposed in any position. Unless the elastically yieldable means have a very great stiffness, and consequently provide a poor filtration of the vibrations, the carrier does not maintain a horizontal position but tilts to the heaviest side of the load. This effect is particularly disadvantageous when the support or carrier is a vehicle and subjects the load to rapid variations of a horizontal force. The load then has a thendency to increase the lateral forces and amplify the roll of the vehicle. The correction of the rolling effects, in the present suspension art involves the use of additional relatively space-consuming and costly mechanical means.

An object of the invention is to provide elastic suspension which has a small rigidity in symmetrical vertical movements, so as to filtrate all the frequencies and variations of the load or of the support, and a great rigidity in roll so as to avoid the inclination of the load irrespective of the distribution of the masses or of the transmission of the lateral forces applied to the load or produced by the load.

The following description and figures, given by way of eample, will explain how the invention can be carried out.

FIG. 1 shows a first embodiment of a device according to the invention.

FIG. 2 shows a second embodiment.

FIG. 3 shows an embodiment in which the suspension element has an evolutive shape.

FIG. 4 shows a device comprising two suspension elements arranged in a cross configuration.

FIGS. 5 to 7 show the shape an element can assume under the action of different loads to obtain a progressively rigid effect.

The device according to the invention, shown in FIG. 1, comprises a suspension element formed by an elastically yieldable central leaf disposed between two rigid end portions 2, 3 and four bearing means 4–7 arranged symmetrically in pairs 4,5; 6,7 relative to the transverse axis of symmetry of the leaf on each of the sides 8,9 of the suspension element. The term "bearing means" is generally intended to mean any device capable of being subjected to tensile or compressive stresses.

In a second embodiment of the element shown in FIG. 2, the rigid end portions 2 and 3 have a triangular longitudinal section, two of the symmetrical bearing means 6,7 being formed by one of the edges defined by an apex of the triangle.

In an embodiment (not shown) derived from the preceding embodiment the rigid end portions 2, 3 having a triangular section constitute the bearing means. Indeed, the two apices opposed to that maintaining the leaf define the symmetrical bearing means 6, 7 and 4, 5.

In a third embodiment represented in FIG. 3, the element has an evolutive shape, the central leaf constituting an elastically yieldable portion 10 connected at its ends to end portions 11, 12 having an increasing thickness and pertaining to the rigid end portions 2, 3. The top portions of the convex portions 11, 12 form two bearing means such are symmetrical relative to the transverse axis of symmetry of the leaf.

In a preferred embodiment, the elastically yieldable leaf is constituted by fibers extruding at least longitudinally from one end to the other and embedded in a suitable binder. FIG. 3 shows an embodiment in which the central portion forming the elastically yieldable leaf is formed by a sheet of fibers (glass, carbon etc..) embedded in a synthetic resin (for example epoxy). Said sheet of fibers forms the skin of the end portions 2, 3 which have a cross-section increasing toward the free ends. The end portions 2, 3 are formed, for example in a plastics material.

This sheet is formed by one or more layers of parallel fibers, the layers being separated at their ends so as to form the two skins of the end portions. The ends of the layer or layers may also be incorporated in the material of the end portions.

The sheet of fibers may be formed by a fabric having an anisotropy in its elastic properties between the perpendicular, transverse and longitudinal directions, the direction of the best elastic property being chosen as the longitudinal direction of the elastically yieldable leaf formed from this fabric.

The operation of the device will now be described with reference to FIG. 2.

It will be assumed that the device rest through the lower bearing means 6 and 7 on a support surface. The upper bearing means 4 and 5 will support the load or a platform on which the load will be placed. Whatever be the position of the load relative to the transverse axis of symmetry XX', the load will produce a symmetrical vertical movement.

The vertical movement will be also produced when the load will undergo an acceleration or a deceleration. The roll, that is, the balancing movements about the longitudinal axis of the device, will not be transmitted. The insensitivity to the rolling movements is due to the transverse rigidity of the element, and in particular of the elastically yieldable leaf 1, the continuous bearing means 6 and 7 having a sufficient length to bear in a stable manner on the support surface.

The bearing means may be discontinuous and formed by substantially spot or localized studs located close to the lateral edges of the element.

It will be understood that the load, or the platform supporting the load, must be sized in proportion to the dimension of the device and in particular that the position of the centre of gravity of the load may determine the design of the bearing means 4 and 5, the latter being within the polygon defined by the bearing means 6, 7.

For loads of large dimensions, a plurality of elements may be associated parallel to each other, and locked in the transverse direction. In the absence of locking, a suspension device will be obtained which has a transversely weakened stiffness relative to a device in one piece.

In an embodiment for use with loads which allow no flexibility in the transverse direction or longitudinal direction, a device is provided which has two elements arranged in the shape of a cross, as shown in FIG. 4. The two upper bearing means are in this case formed by studs 13, 14, 15, 16.

The suspension device according to the invention is applicable in the construction of:

suspended floors for trucks or trailers: a floor bearing on a suspension device having one or more elements bearing against the fixed floor of the vehicle;

pallets for transporting fragile loads allowing a low level of acceleration while filtering the accelerations of the transporter and a possibility of an off-centering of the load without tipping;

various supports for electronic objets, stretchers, sledges, etc..;

anti-vibration suspensions (for turntables of record players for example);

anti-shock devices for transporting fragile objects;

supports for ship-borne or air-borne objects;

shock-absorbers for light arms;

support legs for tilting armchairs or seats.

The foregoing examples of use are non-limiting examples.

The device according to the embodiment shown in FIG. 3, provides a suspension having a variable flexibility and a constant frequency, depending on the load to which it is subjected. FIGS. 5 to 7 show the operation of such a device.

The upper bearing means are formed by the contact lines of a load-supporting platform or plate 17 bearing against the convex ends 11, 12 of the rigid end portions 2, 3. According to the load, the curvature of the leaf 10 is more or less accentuated. Thus, FIG. 5 shows the shape of the suspension element with no load; FIG. 6, the element under a light load and FIG. 7, the element under a heavy load. It is obvious that the flexibility of the leaf is calculated for supporting a load between a minimum value and a maximum value.

The convex end portions 11, 12 perform the junction of cams along which the lines of contact of the platform 17 carrying the load move in accordance with the accelerations to which the load is subjected.

The construction of suspension elements for a given load requires the calculation of the elastically yieldable leaf by using calculation formulae for leaf springs known to persons skilled in the art.

I claim:

1. An elastic suspension device having a great angular rigidity and for disposing between a load and a support, said device comprising at least a suspension element comprising a central elastically yieldable leaf having a transverse axis of symmetry, two rigid end portions between which portions said central leaf is disposed, and four bearing means disposed symmetrically in pairs relative to said transverse axis of symmetry on each side of the suspension element, one of said pair being near the ends of said central elastically yieldable leaf.

2. A device according to claim 1, wherein said two rigid end portions have a triangular longitudinal section, at least two of said symmetrical bearing means being formed by an edge defined by an apex of said triangular section.

3. A device according to claim 1, wherein said suspension element has an evolutive shape and said elastically yieldable leaf forms a central portion of said suspension element of evolutive shape and is connected by ends thereof to convex end portions of said rigid end portions, said convex portions having top portions which constitute two of said bearing means which are symmetrical relative to said transverse axis of symmetry of said leaf.

4. A device according to claim 1, wherein said elastically yieldable leaf is formed by at least one sheet of parallel fibers embedded on a synthetic resin.

5. A device according to claim 4, wherein said sheet of fibers is formed by a fabric having a first elastic property in a first direction and a second elastic property in a second direction, said first elastic property being superior to said second elastic property and said first direction being a longitudinal direction of said leaf formed from a fabric.

6. A device according to claim 4, wherein at least one sheet of fibers constitutes a skin of said end portions.

7. A device according to claim 5, wherein at least one sheet of fibers constitutes a skin of said end portions.

8. A device according to claim 1, comprising two of said suspension elements which are arranged in a cross configuration, each of said two suspension elements carrying at least two spot bearing means which are symmetrical relative said transverse axis of symmetry of said leaf.

9. A device according to claim 1, comprising at least two of said suspension elements in parallel relation to each other.

10. A device according to claim 9, wherein said at least two suspension elements are transversely locked together.

* * * * *